United States Patent
Van Der Wal et al.

(10) Patent No.: US 10,457,576 B2
(45) Date of Patent: Oct. 29, 2019

(54) APPARATUS FOR REMOVAL OF IONS FROM WATER AND METHOD OF PRODUCING THE SAME

(71) Applicant: VOLTEA B.V., Sassenheim (NL)

(72) Inventors: Albert Van Der Wal, Oegstgeest (NL); Piotr Edward Dlugolecki, Gdansk (PL); Hank Robert Reinhoudt, Wassenaar (NL)

(73) Assignee: VOLTEA B.V., Sassenheim (NL)

( * ) Notice: Subject to any disclaimer, the term of this patent is extended or adjusted under 35 U.S.C. 154(b) by 384 days.

(21) Appl. No.: 15/113,005

(22) PCT Filed: Jan. 20, 2015

(86) PCT No.: PCT/NL2015/050033
§ 371 (c)(1),
(2) Date: Jul. 20, 2016

(87) PCT Pub. No.: WO2015/112006
PCT Pub. Date: Jul. 30, 2015

(65) Prior Publication Data
US 2016/0332897 A1    Nov. 17, 2016

(30) Foreign Application Priority Data

Jan. 24, 2014 (NL) .................................. 2012138

(51) Int. Cl.
C02F 1/469 (2006.01)
C02F 1/461 (2006.01)

(52) U.S. Cl.
CPC ........ *C02F 1/4691* (2013.01); *C02F 1/46109* (2013.01); *B01D 2313/345* (2013.01);
(Continued)

(58) Field of Classification Search
CPC .................................................... C02F 1/4691
See application file for complete search history.

(56) References Cited

U.S. PATENT DOCUMENTS

| | | | |
|---|---|---|---|
| 2011/0162965 A1* | 7/2011 | Kim | C02F 1/4691 |
| | | | 204/522 |
| 2012/0037511 A1* | 2/2012 | Xiong | C02F 1/4604 |
| | | | 205/746 |

(Continued)

FOREIGN PATENT DOCUMENTS

| | | |
|---|---|---|
| EP | 2 343 265 | 7/2011 |
| WO | WO 95/32803 A2 | 12/1995 |

(Continued)

OTHER PUBLICATIONS

International Search Report and Written Opinion dated Mar. 23, 2015 in corresponding International Patent Application No. PCT/NL2015/050033.

(Continued)

*Primary Examiner* — Salil Jain
(74) *Attorney, Agent, or Firm* — Pillsbury Winthrop Shaw Pittman LLP

(57) ABSTRACT

An apparatus for removal of ions from water having: a carbon coated first current collector; a second current collector; a spacer in between the first and second current collectors to allow water to flow in between the first and second current collectors; a first charge barrier in between the first carbon coated current collector and the spacer to selectively allow anions or cations to flow through the first charge barrier. The apparatus may have a second charge barrier coated on the carbon coated first current collector and in contact with the first charge barrier to improve contact. A third charge barrier functioning as a membrane may be provided in between the second current collector and the spacer.

20 Claims, 4 Drawing Sheets

(52) U.S. Cl.
CPC ............... *C02F 2001/46138* (2013.01); *C02F 2201/4613* (2013.01); *C02F 2201/46115* (2013.01)

(56) References Cited

U.S. PATENT DOCUMENTS

2013/0146463 A1* 6/2013 Van Der Wal ........ C02F 1/4691 204/554
2014/0144779 A1* 5/2014 Jeong ................... C02F 1/4691 204/536

FOREIGN PATENT DOCUMENTS

| WO | 02/086195 | 10/2002 | | |
|---|---|---|---|---|
| WO | WO-2002086195 | * 10/2002 | | |
| WO | WO-2012011815 A1 | * 1/2012 | ............ | C02F 1/4691 |
| WO | 2012/129532 | 9/2012 | | |
| WO | WO-2012129532 A1 | * 9/2012 | ............ | C02F 1/4691 |

OTHER PUBLICATIONS

International Preliminary Report on Patentability dated Mar. 30, 2016 in corresponding International Patent Application No. PCT/NL2015/050033.

Netherlands Search Report dated Sep. 26, 2014 in corresponding Netherlands Patent Application No. NL 2012138.

Yu-Jin Kim et al., "Improvement of desalination efficiency in capacitive deionization using a carbon electrode coated with an ion-exchange polymer," Water Research, vol. 44, pp. 990-996 (2010).

Examination Report as issued in Indian Patent Application No. 201617026211, dated Jun. 26, 2019.

* cited by examiner

APPARATUS FOR REMOVAL OF IONS FROM WATER AND METHOD OF PRODUCING THE SAME

This application is the U.S. national phase entry of PCT patent application no. PCT/NL2015/050033, which was filed on Jan. 20, 2015, which claims the benefit of NL patent application no. 2012138, which was filed on Jan. 24, 2014.

FIELD

The invention relates to an apparatus for removal of ions from water, the apparatus comprising:
 a carbon coated first current collector;
 a second current collector;
 a spacer in between the first and second current collectors to allow water to flow in between the first and second current collectors; and
 a first charge barrier in between the first carbon coated current collector and the spacer to selectively allow anions or cations to flow through the first charge barrier.

BACKGROUND

In recent years one has become increasingly aware of the impact of human activities on the environment and the negative consequences this may have. Ways to reduce, reuse and recycle resources are becoming more important. In particular, clean water is becoming a scarce commodity. Therefore, various methods and devices for purifying water have been published.

A method for water purification is by capacitive deionisation, using an apparatus provided with a flow through capacitor (FTC) for removal of ions in water. The FTC functions as an electrically regenerable cell for capacitive deionisation. By charging electrodes, ions are removed from an electrolyte and are held in electric double layers at the electrodes. The electrodes can be (partially) electrically regenerated to desorb such previously removed ions without adding chemicals.

The apparatus for removal of ions comprises one or more pairs of spaced apart electrodes (a cathode and an anode) and a spacer, separating the electrodes and allowing water to flow between the electrodes. The electrodes are provided with current collectors or backing layers and a high surface area material, such as e.g. carbon, which may be used to store removed ions. The current collectors may be in direct contact with the high surface area material. Current collectors are electrically conductive and transport charge in and out of the electrodes and into the high surface area material.

A charge barrier may be placed adjacent to an electrode of the flow-through capacitor. The term charge barrier refers to a layer of material which is permeable or semi-permeable for ions and is capable of holding an electric charge. Ions with opposite charge as the charge barrier charge can pass the charge barrier material, whereas ions of similar charge as the charge of the charge barrier cannot pass the charge barrier material. Ions of similar charge as the charge barrier material are therefore contained or trapped either in e.g. the electrode compartment and/or in the spacer compartment. The charge barrier may comprise an ion exchange material provided in a membrane. A membrane provided with ion exchange material may allow an increase in ionic efficiency, which in turn allows energy efficient ion removal.

FIG. 1a gives a schematic representation of the charging of the carbon coated current collector during the ion removal step. During ion removal anion 1 pas the anion exchange membrane 3 (charge barrier) and enter into the carbon electrode (the first carbon coated current collector) 5. These ions are mainly stored in the electrical double layers that form at the carbon-water interface upon electrically charging of the electrode 5. In this example the anions 1 can pass the membrane 3, whereas the cations 7 cannot. The cations 7 are expelled from the carbon-water interface, but cannot pass the membrane 3 and are therefore accumulated inside the electrode pores.

FIG. 1b gives a schematic representation of the discharging of the carbon coated current collector during the electrode regeneration step at reversed potential. During electrode regeneration at reversed potential, the electrode 5 is now negatively charged and the countercharge therefore consists mainly of cations 7. These cations are removed from the carbon pores and are accumulated at the carbon-water interface. As a consequence the salt concentration in the carbon pores becomes very low, because the cations cannot enter the electrodes, whereas the anions are removed from the electrode space during regeneration. This low salt concentration may lead to an increased resistance during regeneration, especially when the first charge barrier layer 3 is not in intimate contact with the first carbon coated current collector 5.

The functioning of the charge barrier in the flow through capacitor is not always optimal because the carbon coated first current collector may have a roughness which may cause the first charge barrier to have a less optimal contact with the carbon coated first current collector.

SUMMARY

It is an objective of the invention to provide an improved apparatus for removal of ions from water.

Accordingly there is provided an apparatus for removal of ions from water, the apparatus comprising:
 a carbon coated first current collector;
 a carbon coated second current collector;
 a spacer in between the first and second current collectors to allow water to flow in between the first and second current collectors; and
 a first charge barrier in between the carbon coated first current collector and the spacer to selectively allow anions or cations to flow through the first charge barrier;
 wherein the apparatus comprises a second charge barrier layer coated onto the carbon coated first current collector and in contact with the first charge barrier.

By coating a second charge barrier layer onto the carbon coated first current collector the carbon coated first current collector is made less rough. The contact between the first charge barrier layer and the carbon coated first current collector is improved in this way improving the functioning of the first charge barrier.

The second charge barrier layer may be provided with anionic and/or cationic groups to provide a charge in the second charge barrier layer. A high charge density may be achieved in the second charge barrier layer because the coating provides for a strong structure to keep the charged groups in the second charge barrier layer. This structure may be provided by a cross-linked polymer network. The same strong structure is advantageously during production of the apparatus because it is more easy to press the first charge barrier against the second charge barrier layer than in the case where a gel is applied onto the carbon coated first current collector. Further, the risk of leaching of the material of the second charge barrier layer is minimized by the strong structure provided by the coating. Leaching of the charged groups in the second charge barrier layer is disadvantageously because the leached charged groups may react with the ions from the water which may lead to precipitation in the carbon coated first current collector or in the second charge barrier layer hindering the functioning of the apparatus. A further problem with leaching is that less ionic groups will remain in the second charge barrier layer and thereby the functionality of this layer will be deteriorating over time. This will lead to an unstable functioning of the apparatus.

According to a further embodiment the second current collector is coated with carbon and a third charge barrier is provided in between the carbon coated second current collector and the spacer to selectively allow anions or cations to flow through the third charge barrier layer.

By providing a third charge barrier in between the second carbon coated current collector and the spacer the anions or cations from the water which flows through the spacer may be selectively transported through the third charge barrier layer.

According to a further embodiment the first and second charge barrier layers may be both positively charged or both negatively charged. The first and second charge barrier layers both have the same charge so as to be selective for the same ions (anions or cations).

The first and/or third charge barrier may be between 10 to 400, preferably 10 to 200, more preferably 15 to 150 micron thick. With this thickness the first and/or third charge barrier may be selective enough to remove anions or cations from the water. The second charge barrier layer may be between 1 to 40, preferably 1 to 30 and most preferably 1 to 20 micron thick. The thickness of the second charge barrier layer may depend on the roughness of the surface of the carbon coated on the first current collector. If the surface of the carbon coated first current collector is very rough then the second charge barrier may be thicker to make the surface of the first current collector flat.

The first and second charge barrier layers may comprise a different material. The material of the second charge barrier may be optimized to be coated onto the carbon coated first current collector. The first charge barrier may not need to be optimized for coating but must have a certain strength for handling during the production of the apparatus for removal of ions. Both layers may therefore have different requirements or specifications.

The apparatus may comprise an anode and a cathode and the carbon coated first current collector may function as the anode and may be provided with first and second charge barrier layers which may be both positively charged barriers. The charge density in the first and second charge barrier layer may be the same, but can also be different. The function of the anode may therefore be optimized by choosing the right specifications of the first and second charge barrier layers.

The apparatus may comprise an anode and a cathode and the first current collector may function as the cathode and may be provided with first and second charge barrier layers which may be both negatively charged barrier layers.

The first charge barrier may comprise a fiber structure for re-enforcement. The reinforcement may strengthen the first charge barrier during production and handling of the first charge barrier layer. The reinforcement may also help with the assembly of the apparatus for removal of ions.

The first and second charge barrier may comprise the same material. The qualification and testing of the apparatus is simplified if the same material is being used. Nevertheless, the physical properties of the first and second charge barrier layer may be different, whereby the second charge barrier layer will be in intimate contact with the carbon coated current collector.

The carbon coated second current collector may be coated with a fourth charge barrier. In this way both carbon coated current collectors may be provided with a coated charge barrier before contact with a further charge barrier is made. Contact between the third charge barrier and the fourth charge barrier may be optimized in this way as well.

The first and second charge barrier layers may be separate barrier layers assembled together in a stack. During manufacturing the first charge barrier may be pressed against the second charge barrier layer.

The second charge barrier may comprise one of polyepichlorochidrin, poly(4-vinyl pyridine-co-styrene), and sulfonated polyether ether ketone. Good results have been obtained with these charge barriers. Sulfonated polyether ether ketone used for the cathode may be combined with polyepichlorochidrin or poly(4-vinyl pyridine-co-styrene) for the anode. In this way contact at both the anode and the cathode may be improved.

According to an embodiment the second charge barrier provides a substantially flat and smooth surface to improve the contact with the first charge barrier layer.

The improved contact between the first and second charge barrier makes that the contact between the carbon coated first current collector and the first and second charge barriers 4 is improved Hereby the resistance at the interface between the carbon coated current collector and the first charge barrier may be decreased. There may also be a higher ionic flux through the charge barriers and the energy consumption for ion removal from the feed water may therefore decrease because of the lower overall resistance. The risk of faradaic reactions and scaling in the apparatus may be lowered, because the operation of the apparatus may be done at lower voltages and/or the ion fluxes through the charge barriers may increase. The stability, efficiency and lifetime of the apparatus may thereby be improved.

The invention further relates to a method of producing a flow through capacitor, the method comprises:

providing a first current collector;

coating carbon onto the first current collector;

coating a second charge barrier onto the carbon coated first current collector;

providing a first charge barrier in contact with the second charge barrier to selectively allow anions or cations to flow through the first charge barrier layer;

providing a spacer in contact with the first charge barrier to allow water to flow along the first carbon coated first current collector; and, providing a carbon coated second current collector against the spacer.

By coating a second charge barrier onto the carbon coated first current collector and in contact with the first charge barrier, the contact between the first charge barrier and the first current collector is improved hence improving the functioning of the first charge barrier.

The first charge barrier may be pressed against the second charge barrier to improve the contact between the first and second charge barriers.

One advantage of the second charge barrier layer is that this layer may flatten or smoothen the first carbon coated current collector (electrode) by filling the space between the carbon particles of the electrode. This will lead to more intimate contact between the electrode and the charge barrier.

Another advantage of using a second charge barrier layer may be increased ion conductivity between the carbon coated current collector and the first charge barrier. This advantage may especially be observed during regeneration of the carbon coated current collector (electrode), especially when the regeneration is done at reversed potential.

A lowering of the resistance may occur by filling the gaps by coating a second charge barrier layer on top of the first carbon coated current collector, whereby the second charge barrier layer helps to improve the conductivity of ions between the carbon electrode and the first charge barrier layer.

BRIEF DESCRIPTION OF THE FIGURES

Embodiments of the invention will be described, by way of example only, with reference to the accompanying schematic drawings in which corresponding reference symbols indicate corresponding parts, and in which:

FIG. 1a gives a schematic representation of the charging of the carbon coated current collector during the ion removal step according to the prior art.

FIG. 1b gives a schematic representation of the discharging of the carbon coated current collector during the electrode regeneration step at reversed potential according to the prior art;

DETAILED DESCRIPTION

Figure 1C:
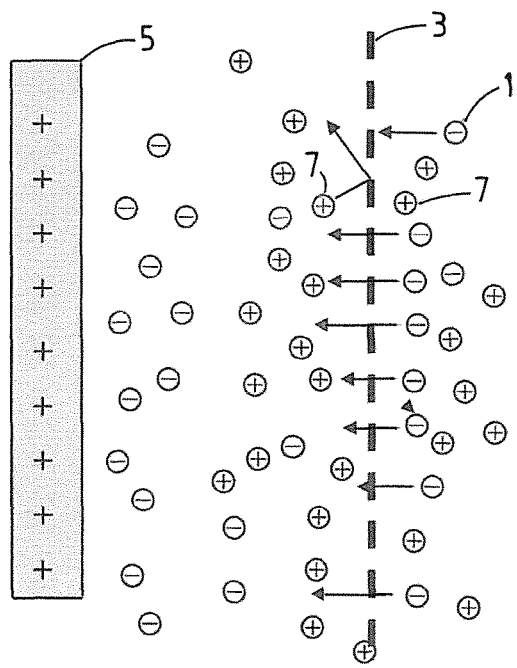
FIG. 1c shows a schematic cross-section of an apparatus for removal of ions according to the invention.
Figure 1C:
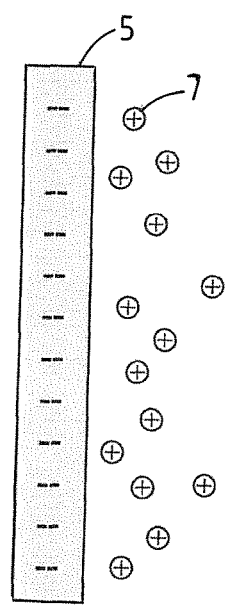
Figure 1C:
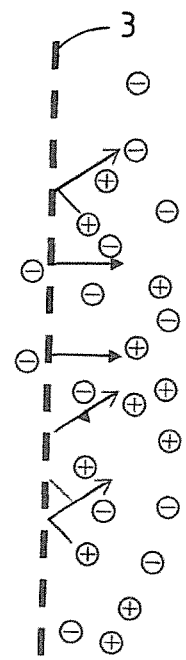
Figure 1C:
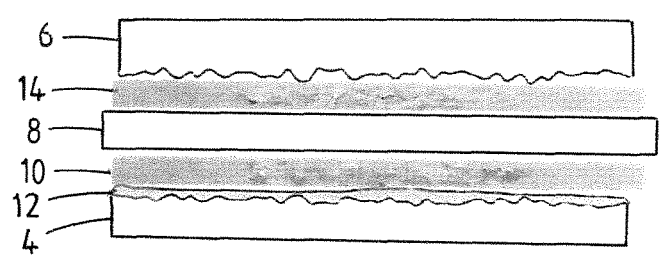

FIG. 1c shows schematically a stack with carbon coated current collectors, spacers and charge barriers in an apparatus for removal of ions. The carbon coated current collectors are also called electrodes, which during operation may either function as an anode (positively charged during ion removal) or as a cathode (negatively charged during ion removal). The carbon coated first current collector 4 and the carbon coated second current collector 6 are stacked with a spacer 8. A first charge barrier 10 functioning as a membrane may be positioned in between the carbon coated first current collector 4 and the spacer 8. A second charge barrier 12 may be coated on the carbon of the carbon coated first current collector 4. The relatively rough carbon coat of the first current collector 4 may be flattened in this way by the coated second charge barrier 12. A third charge barrier 14 functioning as a membrane may be positioned in between the carbon coated second current collector 6 and the spacer 8.

The charge barriers 10 and 14 may have a surface roughness, for example due to fibers of the fiber matrix for membrane reinforcement, sticking out of the membrane. The surface roughness of the membranes and/or of the carbon coated current collectors can be of the order of microns up to several tens of microns. The roughness of the carbon coated current collector is mainly determined by the fact that the surface is made up of densely packed carbon particles, whereby the carbon particles may stick out of the surface of the carbon coated current collector, which leads to surface roughness.

By coating a second charge barrier 12 on the carbon coated first current collector 4 the contact between the first charge barrier layer 10 and the carbon coated first current collector 4 is improved optimizing the functioning of the apparatus. The improved contact also leads to an improved ion flux through the first charge barrier layer and into the electrode (during ion removal) or from the electrode through the first charge barrier (during electrode regeneration). The smoothness or flatness of the carbon coated first current collector 4 is improved by the second charge barrier layer 12 being coated onto the carbon coating of the carbon coated carbon coated first current collector 4. By improving the flatness or smoothness, the contact between the first and second charge barriers 10, 12 and hence with the carbon coated first current collector 4 is improved. Hereby the resistance at the interface between the carbon coated current collector and the first charge barrier may be decreased. There may also be a higher ionic flux through the charge barriers and the energy consumption for ion removal from the feed water may therefore decrease because of the lower overall resistance. The risk of faradaic reactions and scaling in the apparatus may be lowered, because the operation of the apparatus may be done at lower voltages and/or the ion fluxes through the charge barriers may increase. The stability, efficiency and lifetime of the apparatus may thereby be improved. Faradaic reactions occur when the voltage becomes too high whereby electrons are transferred from the electrode into solution by means of a chemical reaction, for example oxidation or reduction of water. Faradaic reactions may lead to oxidation of the apparatus for removal of ions.

During ion removal a positive voltage may be applied to the carbon coated first current collector 4 and a negative voltage may be applied to the carbon coated second current collector 6 while water with ions may be flowing through the spacer 8. The first charge barrier 10 may allow the selective transport of anions, which are attracted by the electrical charge of the positive electrode (anode) to enter into the carbon coated first current collector 4 which is also coated with a second charge barrier layer which also selectively transports the anions. The perm selectivity of the second charge barrier layer may be lower than the perm 20 selectivity of the first charge barrier layer. Also, the resistance of the second charge barrier layer may be lower than that of the first charge barrier layer. The thickness of the coated second charge barrier layer will be smaller than 200 µm, more preferably smaller than 20 µm. The coated second charge barrier layer may have a thickness larger than 1 µm, preferably larger than 2 µm. The function of the first and second charge barrier layer is to selectively allow the transport of anions. These anions are stored in the carbon of the carbon coated first current collector 4. However, some anions may also be stored in the first charge barrier 10 and/or the second charge barrier 12.

If no more anions can be adsorbed in the carbon of the carbon coated first current collector 4, the first charge barrier 10 and/or the second charge barrier 12 then the apparatus is not able to store any more anions and as a next step an ion release step will follow by reducing the positive voltage from the first current collector 4 or by even reversing the polarity by applying a negative voltage on the carbon coated first current collector. The anions will subsequently flow back through the second and first charge barrier layers into the spacer and will be flushed out of the apparatus. In a similar way the cations may be stored in the carbon of the carbon coated second current collector 6 by the negative charge on the electrode (cathode) during the ion removal step and removed from the electrode during the electrode regeneration step, when the voltage is reduced or even reversed. These ions are then also flushed away from the apparatus. In this way it is possible to remove ions from water during the ion removal step and concentrating the ions in a waste water stream which is flushed away, during the electrode regeneration step.

The first and second charge barrier layers 10, 12 may be both positively charged to allow anions to pass selectively through the first and second charge barrier layers as in the above example. With positively charge is meant that positive ion exchange groups are provided in the first and second charge barrier layers, which allow anions to pass through the layers while blocking cations because they have the same charge.

The first and second charge barrier layers 10, 12 may also be both negatively charged to allow cations to pass through the first and second charge barrier layers for example. In this example the carbon coated first current collector 4 may need to be negatively charged to remove ions form the water flowing through the spacer 8.

The second charge barrier layer 12 may also be zwitterionic, which means that this layer contains both anion and cationic groups. The anion and cation groups of the second charge barrier layer may help in the transport of ions through the first charge barrier layer The first and/or third charge barrier may be between 10 to 400, preferably 20 to 200, more preferably 30 to 150 micron thick. With this thickness the first and/or third charge barrier may be selective enough for ions in the water of the feed water stream (the water entering the apparatus). Negatively and positively charged charge barrier layers may be obtained from different suppliers. Well-known materials are: Selemion membranes—Asahi Glass Co., LTD (Japan), Aciplex membranes—Asahi Kasei Chemical Co. (Japan), Fumasep membranes—FuMA-Tech GmbH (Germany), FujiFilm membranes—FujiFilm (Japan), AR and CR series membranes—Ionics Inc. (USA), Ralex membranes—Mega S. A. (Czech Republic), Neosepta membranes—Astom Co. (Japan), Excellion™ I-100/1-200 membranes—SnowPure LLC (USA), Heterogeneous and homogenous membranes—Qianqiu Group Co Ltd. (China), Heterogeneous and homogenous membranes Shandong Tianwei Membrane Technology Co., Ltd. (China), PC-SA/HD, PC-SK, PC-SA, PC 100D, PC 200D, PC Acid 60 and PC Acid 100-PCA GmbH (Germany), CMI-7000 and AMI-7001—Membranes international Inc. (USA). Anion membrane R1-PA, Cation membrane (CEM CDI)—Fuji Film.

The first and/or third charge barrier may comprises a fiber structure for re-enforcement, thereby improving the handling and/or assembly of the first and/or third charge barrier.

The third charge barrier may also be coated onto the carbon coated second current collector. In the same way, the first charge barrier may also be coated onto the second charge barrier layer.

The thickness of the second charge barrier 12 may depend on the roughness of the carbon coated on the first current collector 4. If the first carbon coated current collector 4 is very rough the second charge barrier 12 may be thicker to make the surface of the first current collector flat and to fill the gaps between the carbon coated first current collector and the first charge barrier. Also the thickness may vary over the surface of the carbon coated current collector 4 to make the surface of the second charge barrier layer 12 flatter than the carbon coated first current collector 4.

Figure 1D:
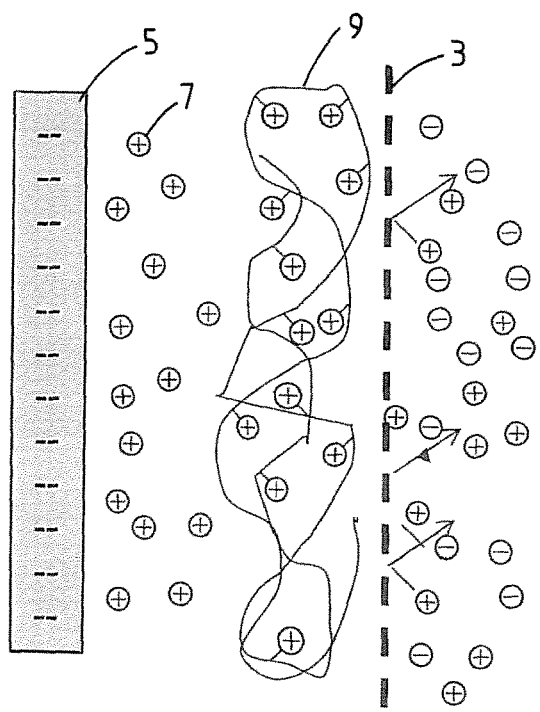
FIG. 1d gives a schematic representation of the discharging of the carbon coated current collector during the electrode regeneration step at reversed potential according to the invention.

FIG. 1d gives a schematic representation of the discharging of the carbon coated current collector according to the invention during the electrode regeneration step at reversed potential. During electrode regeneration at reversed potential, the electrode 5 is now negatively charged and the countercharge therefore consists mainly of cations 7. These cations are removed from the carbon pores and are accumulated at the carbon-water interface. As a consequence the salt concentration in the carbon pores becomes very low, because the cations cannot enter the electrodes, whereas the anions are removed from the electrode space during regeneration. This low salt concentration however does not lead to an increased resistance during regeneration because a second charge barrier layer is provided between the first charge barrier layer 3 and the first carbon coated current collector 5 with charges that increase the conductivity.

The coating of the second charge barrier 12 may be obtained according to the following examples:

Example 1—Polyepichlorochidrin Second Charge Barrier Layer Being Suitable for Application at an Anode—FuiiFilm Membranes as a First Charge Barrier A Polyepichlorochidrin (PECH) layer was prepared from Polyepichlorohydrin (CAS 24969-06-0), 15% solution in DMAc (CAS 127-19-5), polyacrylonitrile (CAS 25014-41-9) 12% solution in DMAc, 1,4-diazabicyclo [2.2.2] octane (CAS number 280-57-9) 15% solution in DMAc. All components were mixed for 30 minutes in order to obtain a homogenous solution. Mass ratio PECH (15% solution in DMAc):polyacrylonitrile (12% solution in DMAc):1,4-diazabicyclo [2.2.2] octane (15% solution in DMAc) 1:1.1:1:52 (volume ratio) Subsequently the mixture was heated up to 70° C. and was mixed for 30 h until the solution was turbid. After this time the solution was cooled down and was ready to be applied as a second charge barrier 12 for coating on a carbon coated current collector 4 for making an anode.

Example 2—Poly(4-Vinvl Pvridine-Co-Stvrene) Second Charge Barrier Layer Being Suitable for Application at an Anode—FuiiFilm Membranes as a First Charge Barrier A Poly(4-vinyl pyridine-co-styrene) (VP) layer was prepared from Poly-4-vinyl pyridine-co-styrene 15.00% solution in DMAc (CAS 127-19-5) and polyacrylonitrile (CAS 25014-41-9) 12% solution in DMAc. Both components were mixed for 30 minutes in order to obtain an homogenous solution. Mass ratio Poly-4-vinylpyridine-co-styrene (15% solution in DMAc):polyacrylonitrile (12% solution in DMAc):1-bromopentane (100% pure) 1:0.38:0.11 (volume ratio).

Subsequently the mixture was heated up to 90° C. and was mixed for 30 h until solution reached a brownish color. After this time the solution was cooled down and it was ready to be applied as a charge barrier layer 12 for making an anode.

Example 3—Sulfonated Polyether Ether Ketone Being Suitable for Application as a Second Charge Barrier Layer at a Cathode—Fujifilm Membranes as a First Charge Barrier Sulfonated polyether ether ketone (SPEEK) layer was prepared from polyether ether ketone, which was dissolved overnight in sulfuric acid (min 95%) (CAS 7664-93-9). Mass ratio of PEEK:sulfuric acid (95%) is 1:20.

The mixture was continuously stirred and heated up to 50° C. for 10 h. After this time the solution was cooled down and was 5 times flushed with pure water (reverse osmosis) until pH was stable. Swollen polymer was dried and dissolved in DMAc (CAS 127-19-5) and it was ready to be coated on the carbon coated current collector for making a cathode.

The charge barrier layers polyepichlorochidrin (PECH), poly(4-vinyl pyridine-co-styrene) (VP) and sulfonated polyether ether ketone (SPEEK) were coated by a blade method on top of the carbon coated current collector. After coating the layers were dried in the oven at 100° C. for 1 h. Visual inspection of the second charge barrier 12 coated on the carbon of the first carbon coated current collector 4 shows that the roughness of the carbon coated current collector is decreased by applying the second charge barrier layer 12 on top of it.

The FTC stack consist of 18-20 repeating cells which are sandwiched between two endplates made from PVC. Each cell consists of a graphite current collector (thickness $\delta=250$ μm) coated with carbon ($\delta=250$ μm), anion charge barrier ACB ($\delta\approx200$ μm) R1-PA and cation charge barriers CCB ($\delta\approx130$ μm) membrane (CEM CDI) produced by FujiFilm and a woven spacer ($\delta=115$ μm). "

The carbon coated current collectors can act either as an anode or a cathode, whereby during purification the cations migrate to the cathode and the anions to the anode. The total electrode area in the FTC stack is ~1 m2. The water flow through the FTC stack was set at 1 L/min/m2 spacer area. The tap water was used with a conductivity of 550 μS/cm. All the stack components were compressed at 2.5 bar.

The second charge barrier 12 on the carbon coated first current collector 4 were made in accordance with table 1.

TABLE 1

FTC stack composition.

| Module | Code | ACB | Second charge barrier coated on the anode | CCB | Second charge barrier coated on the cathode | cells |
|---|---|---|---|---|---|---|
| 1 | PECH | Fuji | Polyepichlorochidrin | Fuji | none | 54 |
| 2 | VP | Fuji | Poly(4-vinyl pyridine-co-styrene) | Fuji | none | 54 |
| 3 | SPEEK | Fuji | none | Fuji | Sulfonated polyether ether ketone | 60 |
| 4 | Reference | Fuji | none | Fuji | none | 54 |

The FTC stack thus obtained were tested in accordance with the test conditions of table 2.

TABLE 2

Test conditions.
Test conditions

| Water | Tap water 515 μS/cm |
|---|---|
| Ion removal | 70% |
| Current | 54 cells - 12.0 A waste and 8.0 A purification |
|  | 60 cells - 13.4 A waste and 8.9 A purification |
| Cycle length | 80 s waste - 120 s purification |
| Flow rate | 1.0 L/min/m$^2$ |
| Voltage limit | 1.2 V waste; 1.8 V pure |

Figure 2:
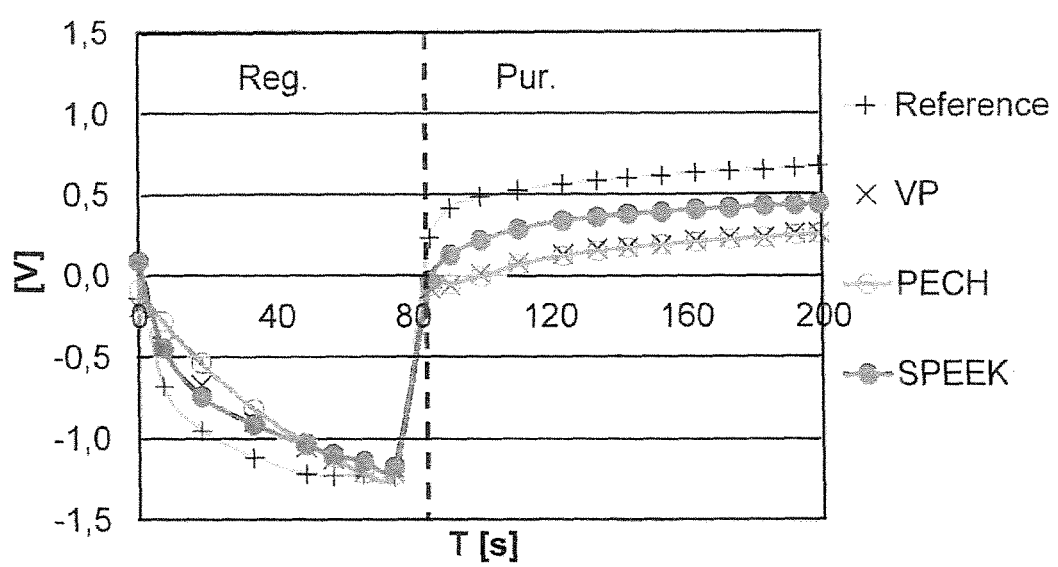
FIG. 2 shows typical regeneration and purification cycles of FTC.

FIG. 2 shows regeneration and purification cycles of the FTC according to the above specifications. The voltage (V) against the time T (s) is depicted. During the first 80 seconds (Reg) the system regenerates from adsorbed salt and after this time polarity of the electrodes is reversed and system starts with purification (Pur.)(remove ions from the feed channel). Constant current conditions were applied during the cycle and a cell voltage was measured, which is the voltage between the two current collectors. The cell voltage at constant current conditions is proportional to the system resistance, which for the stack without the second charge barrier is the highest. The stack with the second charge barrier 12 coated on the carbon coated first current collector 4 as the cathode (SPEEK) performs better than the reference. However, the lowest cell voltage has VP and PECH second charge barriers 12 coated on the first current collector 4 functioning as the anode. These results show that application of a coated charge barrier 12 on the first current collector reduce the cell voltage, which translates to lower energy consumption and also lower risk of faradaic reactions.

Figure 3:
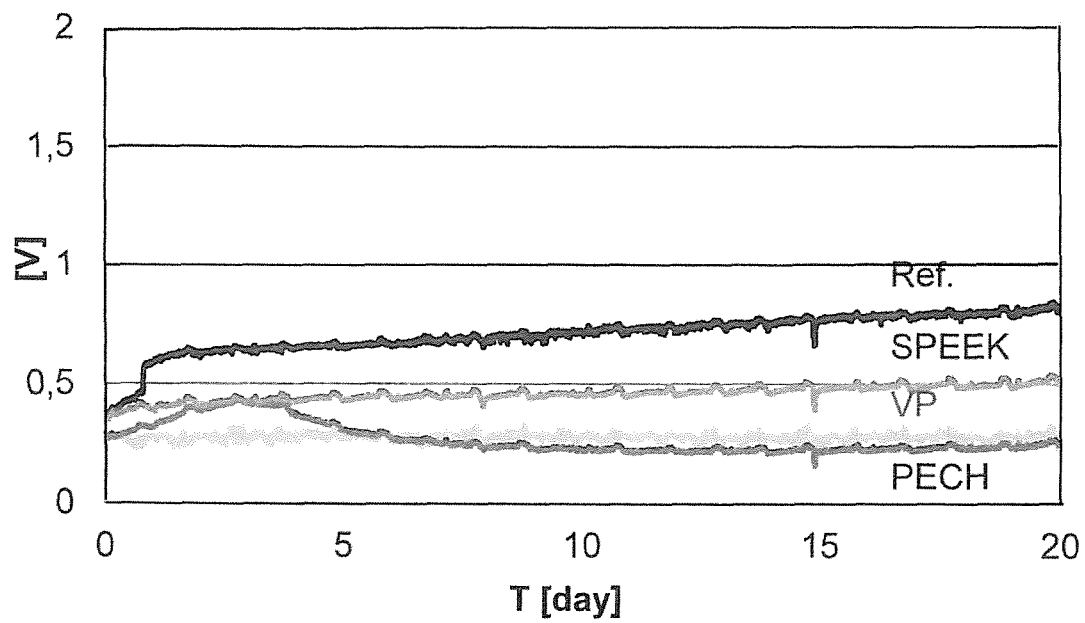
FIG. 3 shows the cell voltage measured during the end of the purification cycle as a function of time (days)

FIG. 3 shows the cell voltage measured during the end of the purification cycle as a function of time T (days). This parameter shows long-term stability of the FTC module. From the slope of the voltages a module lifetime can be calculated and for the reference module the lifetime equals to ca. 80 days, whereas for the module with Poly(4-vinyl pyridine-co-styrene) VP and polyepichlorochidrin PECH second charge barriers 12 a module lifetime is ca. 620 days and 215 days, respectively. Moreover, the energy consumption is proportional to the area under the line, which clearly shows that application of the coated second charge barriers reduces overall energy consumption.

Figure 4:
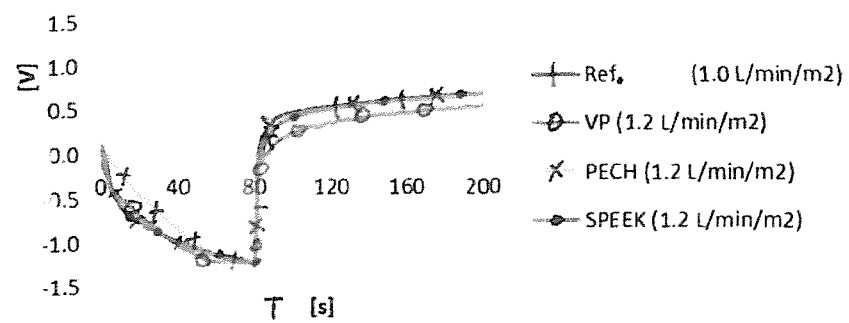
FIG. 4 shows typical regeneration and purification cycles of FTC at a flow rate of 1.0 L/min/m² spacer area and the other three modules with coated second charge barriers operating at 1.2 L/min/m² spacer area.

A low cell voltage provides opportunities to increase the flow rate at the same level of removal i.e. 70% using a higher ionic flux by having a higher current through the module. In FIG. 4 it can be seen that the reference module operates at a flow rate of 1.0 L/min/m$^2$ spacer area and the other three modules with coated second charge barriers operate at 1.2 L/min/m$^2$ spacer area. The cell voltage (V) for modules operated at 20% higher flow is at the same level or even lower compared to the reference module at the same time T in seconds. These results show that the performance of the FTC stack can be increased by 20% without any increase in the cell voltage.

As in the examples the first and second charge barrier layers may comprise a different material. The first current collector may function as the anode and may be provided with the first and second charge barrier layers which are both positively charged barrier layers (See the example VP and PECH for details).

The first current collector may function as the cathode and may be provided with first and second charge barrier layers which are both negatively charged barriers (See the example SPEEK for details).

We may also combine the second coated charge barrier of VP or PECH with a second carbon coated current collector coated with a fourth charge barrier layer with SPEEK.

Example 4—Poly(4-Vinyl Pyridine-Co-Styrene) Second Charge Barrier Being Suitable for Application at an Anode—Pca Membranes as a First Charge Barrier The poly(4-vinyl pyridine-co-styrene) charge barrier was blade coated (100 µm wet thickness) in the laboratory. Coating solution was prepared according to example 2. The electrodes were dried for 1 h at 100° C. and the dry layer thickness was ca. 12 µm. After drying the coated charge barrier layer on top of the carbon, the electrode was conditioned in tap water for 12 h. A FTC module with charge barrier layer at the anode with 20 cells (code PCA+VP) was built and data was measured after the $3^{rd}$ day in order to ensure system equilibration. Reference module was build (code PCA) without any conductive layer.

In Table 3 stack composition is listed.

The FTC stack consists of 20 repeating cells which are sandwiched between two endplates made from PVC. Each cell consists of a graphite current collector (thickness $\delta=250$ µm) coated with carbon ($\delta=250$ µm), anion charge barrier ACB ($\delta\approx220$ µm) PCA reinforced ion exchange membrane and cation charge barriers CCB ($\delta\approx30$ µm) PCA membrane (PCA standard ion exchange membrane—non reinforced) produced by PCA GmbH (Germany) and a woven spacer ($\delta=115$ µm).

TABLE 3

FTC stack composition.

| Module | Code | ACB | Second charge barrier coated on the anode | CCB | Second charge barrier coated on the cathode | cells |
|---|---|---|---|---|---|---|
| 1 | PCA + VP | PCA reinforced | Poly(4-vinyl pyridine-co-styrene) | PCA standard non-reinforced | none | 20 |
| 2 | PCA | PCA reinforced | none | PCA standard non-reinforced | none | 20 |

In Table 4 test conditions of the test are presented.

TABLE 4

Test conditions.

| Test conditions | |
|---|---|
| Water | Tap water 530 µS/cm |
| Ion removal | 70% |
| Current | 20 cells - 4.59 A waste and 3.06 A purification |
| Cycle length | 80 s waste - 120 s purification |
| Flow rate | 1.0 L/min/m² |
| Voltage limit | 1.2 V waste; 1.2 V pure |

Figure 5:
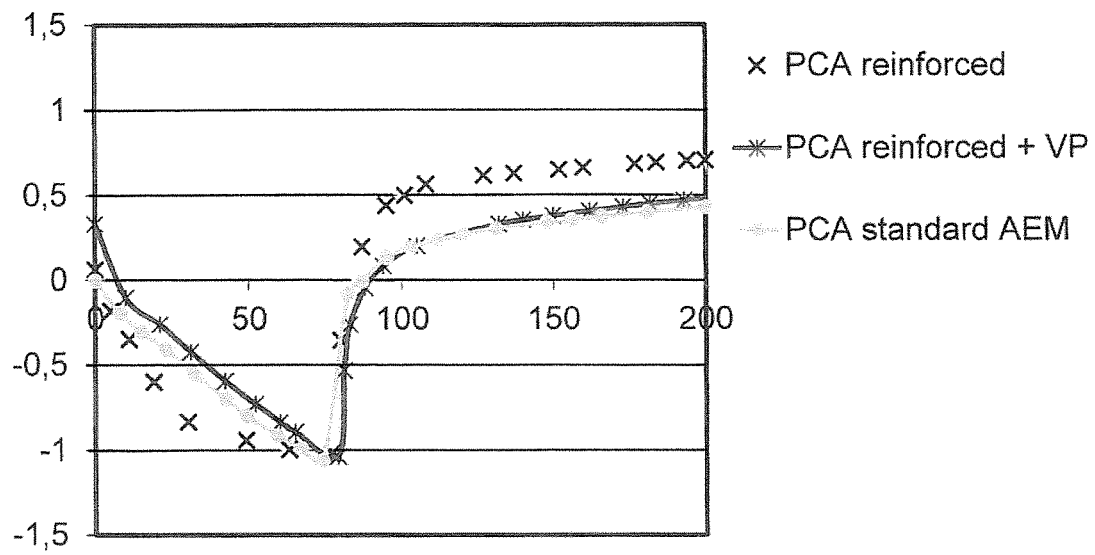
FIG. 5 shows regeneration and purification cycles of the FTC according to table 4; and, FIG. 6 shows regeneration and purification cycles of the FTC according to table 5.

FIG. 5 shows regeneration and purification cycles of the FTC according to the above specifications. The voltage (V) against the time T (s) is depicted. During the first 80 seconds (Reg.) the system regenerates from adsorbed salt and after this time the polarity of the electrodes is reversed and system starts with purification (Pur.) (remove ions from the feed channel). Constant current conditions were applied during the cycle and a cell voltage was measured, which is the voltage between the two current collectors. The cell voltage at constant current conditions is proportional to the system resistance, which for the stack without the charge barrier (code: PCA) is the highest. The stack with the second charge barrier 12 coated on the first current collector 4 as the anode (code: PCA+VP) performs better than the reference. These results show that application of a coated charge barrier 12 on the first current collector reduce the cell voltage, which translates to lower energy consumption and also lower risk of faradaic reactions.

Example 5—Polyepichlorochidrin Second Charge Barrier Layer Being Suitable for Application at an Anode and Sulfonated Polyether Ether Ketone Second Charge Barrier Layer Being Suitable for Application at Cathode—Snowpure Excellion™ Membranes as the First Charge Barrier The polyepichlorochidrin charge barrier was blade coated (100 µm wet thickness) in the laboratory. Coating solution was prepared according to example 1. The electrodes were dried for 1 h at 100° C. and the dry layer thickness was ca. 12 µm. After drying the coated charge barrier layer on top of the carbon, the electrode was conditioned in tap water for 12 h. The sulfonated polyether ether ketone second charge barrier was blade coated (50 µm wet thickness) in the laboratory. Coating solution was prepared according to example 3. The electrodes were dried for 1 h at 100° C. and the dry layer thickness was ca. 10 µm. After drying the coated charge barrier layer on top of the carbon, the electrode was conditioned in tap water for 12 h.

The FTC stack consists of 16 repeating cells which are sandwiched between two endplates made from PVC. Each cell consist of a graphite current collector (thickness $\delta=250$ µm) coated with carbon ($\delta=250$ µm), anion charge barrier ACB ($\delta=350$ µm dry) SnowPure Excellion™ I-200 and cation charge barriers CCB ($\delta350$ µm dry) SnowPure Excellion™ I-100 produced by SnowPure (USA) and woven spacer ($\delta=115$ µm). Both SnowPure membranes are reinforced. A FTC module with charge barrier with 16 cells (code SnowPure+PECH+SPEEK) was built and data was measured after $3^{rd}$ day in order to ensure system equilibration. Reference module was build (code SnowPure) without charge barrier layers.

In Table 5 FTC stack composition is listed.

| Module | Code | ACB | Second charge barrier coated on the anode | CCB | Second charge barrier coated on the cathode | cells |
|---|---|---|---|---|---|---|
| 1 | SnowPure + PECH + SPEEK | SnowPure + Excellion MI-200 | Polyepichlorochidrin | Snowpure Excellion MI-100 | Sulfonated polyether ether ketone | 16 |
| 2 | SnowPure | SnowPure Excellion MI-200 | none | Snowpure Excellion MI-100 | none | 16 |

In Table 6 test conditions of the test are presented.

| Test conditions | |
|---|---|
| Water | Tap water 530 µS/cm |
| Ion removal | 70% |
| Current | 16 cells - 4.49 A waste and 2.99 A purification |
| Cycle length | 80 s waste - 120 s purification |
| Flow rate | 1.2 L/min/m² |
| Voltage limit | 1.7 V waste; 1.7 V pure |

Figure 6:
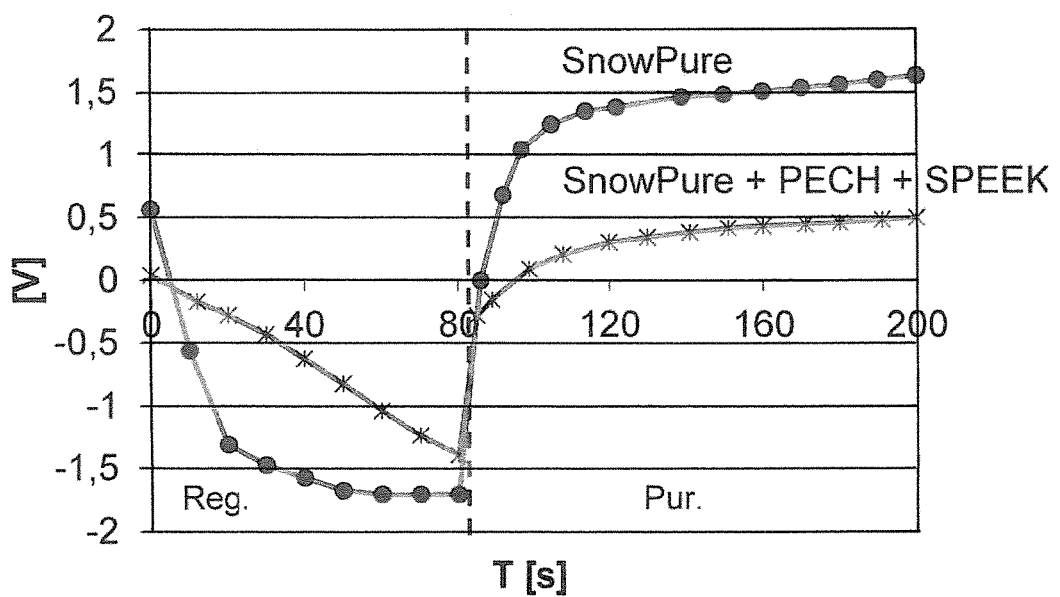

FIG. 6 shows regeneration and purification cycles of the FTC according to table 5. The voltage (V) against the time T (s) is depicted. During the first 80 seconds (Reg.) the system regenerates from adsorbed salt and after this time polarity of the electrodes is reversed and system starts with purification (Pur.) (remove ions from the feed channel). Constant current conditions were applied during the cycle and a cell voltage was measured, which is the voltage between the two current collectors. The cell voltage at constant current conditions is proportional to the system resistance, which for the stack without the charge barrier (code: SnowPure) is the highest. The stack with the second charge barrier (polyepichlorochidrin) 12 coated on the carbon coated first current collector 4 as the anode and with the second charge barrier (sulfonated polyether ether ketone) (code: SnowPure+PECH+SPEEK) performs better than the. These results show that application of a coated charge barrier 12 on the carbon coated first current collector on the anode and the cathode reduce the cell voltage, which translates to lower energy consumption and also lower risk of faradaic reactions.

While specific embodiments of the invention have been described above, it will be appreciated that the invention may be practiced otherwise than as described. The invention is intended to be illustrative not limiting. Thus it will be apparent to one skilled in the art that modifications may be made to the invention as described without departing form the scope of the claims set out below.

The invention claimed is:

1. An apparatus for removal of ions from water, the apparatus comprising:
   a carbon coated first current collector;
   a second current collector;
   a spacer in between the first and second current collectors to allow water to flow through the spacer in between the first and second current collectors;
   a first charge barrier in between the carbon coated first current collector and the spacer to selectively allow anions or cations to flow through the first charge barrier; and
   a second charge barrier coated onto the carbon coated first current collector and in contact with the first charge barrier, the second charge barrier being between 1 to 40 microns thick.

2. The apparatus according to claim 1, wherein the second current collector is coated with carbon and a third charge barrier is provided in between the carbon coated second current collector and the spacer to selectively transport anions or cations to flow through the third charge barrier.

3. The apparatus according to claim 1, wherein the first charge barrier is configured to block cations from passing through the first charge barrier while allowing anions to pass through the first charge barrier and the second charge barrier is configured to block cations from passing through the second charge barrier while allowing anions to pass through the second charge barrier, or
   wherein the first charge barrier is configured to block anions from passing through the first charge barrier while allowing cations to pass through the first charge barrier and the second charge barrier is configured to block anions from passing through the second charge barrier while allowing cations to pass through the second charge barrier.

4. The apparatus according to claim 1, wherein the first charge barrier is between 10 to 400 microns thick.

5. The apparatus according to claim 1, wherein the second charge barrier is between 1 to 20 microns thick.

6. The apparatus according to claim 1, wherein the first charge barrier comprises a different material than the second charge barrier.

7. The apparatus according to claim 1, wherein the first current collector functions as an anode and is provided with the first charge barrier, which is configured to block cations from passing through the first charge barrier while allowing anions to pass through the first charge barrier, and with the second charge barrier, which is configured to block cations from passing through the second charge barrier while allowing anions to pass through the second charge barrier.

8. The apparatus according to claim 1, wherein the first current collector functions as a cathode and is provided with the first charge barrier, which is configured to block anions from passing through the first charge barrier while allowing cations to pass through the first charge barrier, and with the second charge barrier, which is configured to block anions from passing through the second charge barrier while allowing cations to pass through the second charge barrier.

9. The apparatus according to claim 1, wherein the first charge barrier comprises a fiber structure for reinforcement.

10. The apparatus according to claim 1, wherein the first and second charge barriers comprise the same material.

11. The apparatus according to claim 1, wherein the second current collector is coated with a charge barrier.

12. The apparatus according to claim 1, wherein the first and second charge barriers are separate layers assembled together in a stack.

13. The apparatus according to claim 1, wherein the second charge barrier comprises polyepichlorochidrin, poly(4-vinyl pyridine-co-styrene) or sulfonated polyether ether ketone.

14. The apparatus according to claim 1, wherein the second charge barrier provides a substantially flat and smooth surface to improve the contact with the first charge barrier.

15. A method of producing an apparatus for removal of ions from water of claim 1, the method comprising:
- coating a second charge barrier onto a carbon coated first current collector, the second charge barrier being between 1 to 40 microns thick;
- providing a first charge barrier in contact with the second charge barrier to selectively allow anions or cations to flow through the first charge barrier;
- providing a spacer in contact with the first charge barrier; and
- providing a second current collector against the spacer, the spacer between the first and second current collectors arranged to allow water to flow through the spacer in between the first and second current collectors.

16. The method according to claim 15, wherein the first charge barrier is pressed against the second charge barrier.

17. The method according to claim 15, further comprising coating the carbon onto the first current collector.

18. The method according to claim 15, wherein the first charge barrier is configured to block cations from passing through the first charge barrier while allowing anions to pass through the first charge barrier and the second charge barrier is configured to block cations from passing through the second charge barrier while allowing anions to pass through the second charge barrier, or
- wherein the first charge barrier is configured to block anions from passing through the first charge barrier while allowing cations to pass through the first charge barrier and the second charge barrier is configured to block anions from passing through the second charge barrier while allowing cations to pass through the second charge barrier.

19. The method according to claim 15, wherein the second current collector is coated with carbon and a third charge barrier is provided in between the carbon coated second current collector and the spacer to selectively transport anions or cations to flow through the third charge barrier.

20. The method according to claim 15, wherein the first charge barrier comprises a different material than the second charge barrier.

* * * * *